United States Patent
Zhang

(10) Patent No.: US 11,452,134 B2
(45) Date of Patent: Sep. 20, 2022

(54) CHANNEL ACCESS METHOD AND DEVICE, STORAGE MEDIUM, TERMINAL, AND BASE STATION

(71) Applicant: SPREADRUM COMMUNICATIONS (SHANGHAI) CO., LTD., Shanghai (CN)

(72) Inventor: Meng Zhang, Shanghai (CN)

(73) Assignee: SPREADRUM COMMUNICATIONS (SHANGHAI) CO., LTD., Shanghai (CN)

( * ) Notice: Subject to any disclaimer, the term of this patent is extended or adjusted under 35 U.S.C. 154(b) by 61 days.

(21) Appl. No.: 17/042,559

(22) PCT Filed: Apr. 2, 2019

(86) PCT No.: PCT/CN2019/080908
§ 371 (c)(1),
(2) Date: Sep. 28, 2020

(87) PCT Pub. No.: WO2019/192444
PCT Pub. Date: Oct. 10, 2019

(65) Prior Publication Data
US 2021/0127419 A1    Apr. 29, 2021

(30) Foreign Application Priority Data
Apr. 4, 2018    (CN) .......................... 201810305526.9

(51) Int. Cl.
*H04W 74/08* (2009.01)
*H04W 72/04* (2009.01)
*H04L 5/00* (2006.01)

(52) U.S. Cl.
CPC ....... *H04W 74/0808* (2013.01); *H04L 5/0048* (2013.01); *H04W 72/042* (2013.01)

(58) Field of Classification Search
CPC ............ H04W 74/0808; H04W 72/042; H04L 5/0048
See application file for complete search history.

(56) References Cited

U.S. PATENT DOCUMENTS

2016/0302076 A1*  10/2016  Chou ................ H04W 52/0225
2016/0337869 A1*  11/2016  Dai ........................ H04W 16/14
(Continued)

FOREIGN PATENT DOCUMENTS

| CN | 107079490 A | 8/2017 |
| CN | 107371274 A | 11/2017 |
| CN | 107852752 A | 3/2018 |

OTHER PUBLICATIONS

CNIPA First Office Action for corresponding CN Application No. 201810305526.9; dated Mar. 31, 2021.

*Primary Examiner* — Ronald B Abelson
(74) *Attorney, Agent, or Firm* — Cantor Colburn LLP

(57) ABSTRACT

A channel access method and device, a storage medium, a terminal, a terminal, and a base station are provided. The method comprises: receiving configuration information, the configuration comprising configuration information of at least one available bandwidth configured to perform an LBT operation, and the at least one available bandwidth is a portion of bandwidth of a carrier; performing the LBT operation on the at least one available bandwidth indicated by the configuration information to listen to a channel; and when the LBT operation on any one of the at least one available bandwidth succeeds, performing uplink data transmission on the available bandwidth to access the channel. By providing the method where LBT is achieved based on a portion of bandwidth of a carrier on an unlicensed band, the UE may better meet OCB requirements for transmitted signals on the unlicensed band in the NR system.

19 Claims, 5 Drawing Sheets

(56) References Cited

U.S. PATENT DOCUMENTS

| | | |
|---|---|---|
| 2017/0019909 A1 | 1/2017 | Si et al. |
| 2018/0279372 A1 | 9/2018 | Takeda et al. |
| 2019/0159253 A1* | 5/2019 | Koorapaty .......... H04W 74/006 |
| 2020/0275490 A1 | 8/2020 | Li et al. |
| 2020/0344757 A1* | 10/2020 | Chen ................ H04W 72/0446 |

* cited by examiner

CHANNEL ACCESS METHOD AND DEVICE, STORAGE MEDIUM, TERMINAL, AND BASE STATION

CROSS-REFERENCE TO RELATED APPLICATIONS

This is the U.S. national stage of application No. PCT/CN2019/080908, filed on Apr. 2, 2019, Priority under 35 U.S.C. § 365(b) is claimed from Chinese Application No. 201810305526.9, filed Apr. 4, 2018, and entitled "CHANNEL ACCESS METHOD AND DEVICE, STORAGE MEDIUM, TERMINAL, AND BASE STATION", the entire disclosure of which is also incorporated herein by reference.

TECHNICAL FIELD

The present disclosure generally relates to communication technology field, and more particularly, to a channel access method and device, a storage medium, a terminal, and a base station.

BACKGROUND

At present, on unlicensed bands, especially at high frequencies (37 GHz or 60 GHz), transmission based on beam (i.e., spatial configuration of a reference signal resource) is still applicable. However, on unlicensed bands, other technologies (such as WiFi, Bluetooth or Zigbee) always exist. On the unlicensed band of 5 GHz, there may be Long Term Evolution Licensed Assisted Access (LTE-LAA). Under a New Radio (NR) architecture, how NR-LAA can coexist fairly with these existing technologies on unlicensed bands is an important research subject in the future. In existing techniques, it has been proposed to use a Listen Before Talk (LBT) mechanism to achieve fair competition of different technologies on unlicensed bands.

According to relevant specifications of European Telecommunications Standards Institute (ETSI), Occupied Channel Bandwidth (OCB) of a transmission signal on unlicensed bands is specified. At 5 GHz, OCB of a transmission equipment (such as a user equipment, UE) should contain 99% of energy of a signal, and occupy 80% to 100% of Nominal Channel Bandwidth (NCB). While At 60 GHz, OCB of the transmission equipment should be no less than 70% of the NCB.

In an LTE LAA (eLAA/FeLAA) protocol, the NCB refers to bandwidth of a Component Carrier (CC, referred to as carrier).

In an NR system, based on the latest protocol, bandwidth allocation is more flexible. In addition to bandwidth of a carrier, one or more bandwidth-part (BWP) can also be configured within a carrier for uplink or downlink transmission.

In this case, if the bandwidth of the carrier is still used as the NCB, it may be difficult to meet requirements of the OCB of the UE.

Therefore, under the unlicensed bands, there is no suitable solution that can adapt to a bandwidth allocation standard in the NR system to achieve channel access with the LBT mechanism.

SUMMARY

Embodiments of the present disclosure adapt to a bandwidth allocation standard in an NR system to achieve channel access with an LBT mechanism.

In an embodiment of the present disclosure, a channel access method is provided, including: receiving configuration information, wherein the configuration information includes configuration information of at least one available bandwidth that is configured to perform an LBT operation, and the at least one available bandwidth is a portion of bandwidth of a carrier; performing the LBT operation on the at least one available bandwidth indicated by the configuration information to listen to a channel; and when the LBT operation on any one of the at least one available bandwidth succeeds, performing uplink data transmission on the available bandwidth to access the channel.

Optionally, the method further includes: before receiving the configuration information, transmitting LBT capability report information, wherein the LBT capability report information indicates the number of the at least one available bandwidth that is configured to perform the LBT operation.

Optionally, the LBT capability report information is selected from a group consisting of: the number of one or more available bandwidths for the LBT operation simultaneously performed on one carrier; the number of one or more available bandwidths for the LBT operation simultaneously performed on a plurality of carriers; the number of one or more available bandwidths for the LBT operation performed on one carrier; and the number of one or more available bandwidths for the LBT operation performed on a plurality of carriers.

Optionally, each of the at least one available bandwidth is associated with at least one listen direction that is determined based on spatial configuration of a reference signal resource. For example, the available bandwidth may employ spatial configuration same as an associated reference signal resource, or, the available bandwidth and the associated reference signal resource have same QCL configuration, or, the available bandwidth and the associated reference signal resource have same QCL configuration of type-D. Performing the LBT operation on the at least one available bandwidth indicated by the configuration information includes: for each of the at least one available bandwidth, performing the LBT operation in each listen direction associated with the available bandwidth.

Optionally, for each of the at least one available bandwidth, performing the LBT operation in each listen direction associated with the available bandwidth includes: detecting an idle status of the channel within a first preset duration, wherein the first preset duration is indicated based on the configuration information; if a detection result within the first preset duration indicates that the channel is in the idle status, for each listen direction associated with the available bandwidth, after the first preset duration expires, determining a count value, wherein the count value indicates whether to listen to the channel in the listen direction associated with the available bandwidth, and is a random number selected from a preset range which is determined based on a preset value and the configuration information; continuing detecting the idle status of the channel within a second preset duration; if a detection result within the second preset duration indicates that the channel is in the idle status, determining whether the count value is zero; and if the count value is zero, determining that the LBT operation in the listen direction associated with the available bandwidth succeeds.

Optionally, for each of the at least one available bandwidth, performing the LBT operation in each listen direction associated with the available bandwidth further includes: when the count value is not zero, decreasing the count value by one, and continuing detecting the idle status of the channel within the second preset duration until the detection result within the second preset duration indicates that the channel is in the idle status.

Optionally, performing uplink data transmission on the available bandwidth to access the channel includes: performing uplink data transmission in the listen direction associated with the available bandwidth in which direction the LBT operation succeeds, to access the channel.

Optionally, the configuration information is received via a primary cell or a secondary cell.

Optionally, the at least one available bandwidth is selected from a group consisting of BWP and subband.

Optionally, the configuration information includes position indication information of the at least one available bandwidth.

Optionally, the configuration information includes type indication information of LBT.

Optionally, the configuration information includes spatial configuration indication information of LBT, used to indicate the listen direction where the LBT operation is performed.

Optionally, the configuration information includes indication information of a channel access level.

Optionally, the configuration information includes indication information of an LBT timer.

Optionally, the configuration information includes activation indication information of LBT.

Optionally, the configuration information includes deactivation indication information of LBT.

Optionally, the configuration information is carried by any of a high-layer signaling (such as an RRC signaling), a PDCCH, a DCI or a MAC-CE.

In an embodiment of the present disclosure, a channel access device is provided, including: a receiving circuitry configured to receive configuration information, wherein the configuration information includes configuration information of at least one available bandwidth that is configured to perform an LBT operation, and the at least one available bandwidth is a portion of bandwidth of a carrier; a listening circuitry configured to perform the LBT operation on the at least one available bandwidth indicated by the configuration information to listen to a channel; and a first transmitting circuitry configured to: when the LBT operation on any one of the at least one available bandwidth succeeds, perform uplink data transmission on the available bandwidth to access the channel.

Optionally, the device further includes a second transmitting circuitry configured to: before receiving the configuration information, transmit LBT capability report information, wherein the LBT capability report information indicates the number of the at least one available bandwidth that is configured to perform the LBT operation.

Optionally, the LBT capability report information is selected from a group consisting of: the number of one or more available bandwidths for the LBT operation simultaneously performed on one carrier; the number of one or more available bandwidths for the LBT operation simultaneously performed on a plurality of carriers; the number of one or more available bandwidths for the LBT operation performed on one carrier; and the number of one or more available bandwidths for the LBT operation performed on a plurality of carriers.

Optionally, each of the at least one available bandwidth is associated with at least one listen direction that is determined based on spatial configuration of a reference signal resource, and the listening circuitry includes a listening sub-circuitry configured to: for each of the at least one available bandwidth, perform the LBT operation in each listen direction associated with the available bandwidth.

Optionally, the listening sub-circuitry includes: a first detecting circuitry configured to detect an idle status of the channel within a first preset duration, wherein the first preset duration is indicated based on the configuration information; a value determining circuitry configured to: if a detection result within the first preset duration indicates that the channel is in the idle status, for each listen direction associated with the available bandwidth, after the first preset duration expires, determine a count value, wherein the count value indicates whether to listen to the channel in the listen direction associated with the available bandwidth, and is a random number selected from a preset range which is determined based on a preset value and the configuration information; a second detecting circuitry configured to continue detecting the idle status of the channel within a second preset duration; a judging circuitry configured to: if a detection result within the second preset duration indicates that the channel is in the idle status, determine whether the count value is zero; and a result determining circuitry configured to: if the count value is zero, determine that the LBT operation in the listen direction associated with the available bandwidth succeeds.

Optionally, the listening sub-circuitry further includes: a value updating circuitry configured to: when the count value is not zero, decrease the count value by one, and continue detecting the idle status of the channel within the second preset duration until the detection result within the second preset duration indicates that the channel is in the idle status.

Optionally, the first transmitting circuitry includes a transmitting sub-circuitry configured to perform uplink data transmission in the listen direction associated with the available bandwidth in which direction the LBT operation succeeds, to access the channel.

Optionally, the configuration information is received via a primary cell or a secondary cell.

Optionally, the at least one available bandwidth is selected from a group consisting of BWP and subband.

Optionally, the configuration information includes position indication information of the at least one available bandwidth.

Optionally, the configuration information includes type indication information of LBT.

Optionally, the configuration information includes spatial configuration indication information of LBT, used to indicate the listen direction where the LBT operation is performed.

Optionally, the configuration information includes indication information of a channel access level.

Optionally, the configuration information includes indication information of an LBT timer.

Optionally, the configuration information includes activation indication information of LBT.

Optionally, the configuration information includes deactivation indication information of LBT.

Optionally, the configuration information is carried by any of a high-layer signaling (such as an RRC signaling), a PDCCH, a DCI or a MAC-CE.

In an embodiment of the present disclosure, a channel access method is provided, including: determining configuration information based on LBT capability of a UE, and transmitting the configuration information, wherein the configuration information includes configuration information of at least one available bandwidth that is configured for the UE to perform an LBT operation, and the at least one available bandwidth is a portion of bandwidth of a carrier; and in response to receiving uplink data, allowing or rejecting the UE to access a channel to which the uplink data points, wherein the uplink data is transmitted when the LBT operation performed by the UE on any one of the at least one available bandwidth succeeds.

Optionally, the LBT capability of the UE is determined based on LBT capability report information reported by the UE.

Optionally, the LBT capability report information is selected from a group consisting of: the number of one or more available bandwidths for the LBT operation simultaneously performed on one carrier; the number of one or more available bandwidths for the LBT operation simultaneously performed on a plurality of carriers; the number of one or more available bandwidths for the LBT operation performed on one carrier; and the number of one or more available bandwidths for the LBT operation performed on a plurality of carriers.

Optionally, the LBT capability of the UE is acquired via pre-interaction with the UE.

Optionally, the configuration information is transmitted via a primary cell or a secondary cell where the UE is located.

Optionally, the at least one available bandwidth is selected from a group consisting of BWP and subband.

Optionally, the configuration information includes position indication information of the at least one available bandwidth.

Optionally, the configuration information includes type indication information of LBT.

Optionally, the configuration information includes spatial configuration indication information of LBT, used to indicate the listen direction where the LBT operation is performed.

Optionally, the configuration information includes indication information of a channel access level.

Optionally, the configuration information includes indication information of an LBT timer.

Optionally, the configuration information includes activation indication information of LBT.

Optionally, the configuration information includes deactivation indication information of LBT.

Optionally, the configuration information is carried by any of a high-layer signaling (such as an RRC signaling), a PDCCH, a DCI or a MAC-CE.

In an embodiment of the present disclosure, a channel access device is provided, including: a determining and transmitting circuitry configured to: determine configuration information based on LBT capability of a UE, and transmit the configuration information, wherein the configuration information includes configuration information of at least one available bandwidth that is configured for the UE to perform an LBT operation, and the at least one available bandwidth is a portion of bandwidth of a carrier; and a controlling circuitry configured to: in response to receiving uplink data, allow or reject the UE to access a channel to which the uplink data points, wherein the uplink data is transmitted when the LBT operation performed by the UE on any one of the at least one available bandwidth succeeds.

Optionally, the LBT capability of the UE is determined based on LBT capability report information reported by the UE.

Optionally, the LBT capability report information is selected from a group consisting of: the number of one or more available bandwidths for the LBT operation simultaneously performed on one carrier; the number of one or more available bandwidths for the LBT operation simultaneously performed on a plurality of carriers; the number of one or more available bandwidths for the LBT operation performed on one carrier; and the number of one or more available bandwidths for the LBT operation performed on a plurality of carriers.

Optionally, the LBT capability of the UE is acquired via pre-interaction with the UE.

Optionally, the configuration information is transmitted via a primary cell or a secondary cell where the UE is located.

Optionally, the at least one available bandwidth is selected from a group consisting of BWP and subband.

Optionally, the configuration information includes position indication information of the at least one available bandwidth.

Optionally, the configuration information includes type indication information of LBT.

Optionally, the configuration information includes spatial configuration indication information of LBT, used to indicate the listen direction where the LBT operation is performed.

Optionally, the configuration information includes indication information of a channel access level.

Optionally, the configuration information includes indication information of an LBT timer.

Optionally, the configuration information includes activation indication information of LBT.

Optionally, the configuration information includes deactivation indication information of LBT.

Optionally, the configuration information is carried by any of a high-layer signaling (such as an RRC signaling), a PDCCH, a DCI or a MAC-CE.

In an embodiment of the present disclosure, a storage medium having computer instructions stored therein is provided, wherein when the computer instructions are executed, any one of the above methods is performed.

In an embodiment of the present disclosure, a terminal including a memory and a processor is provided, wherein the memory has computer instructions stored therein, and when the processor executes the computer instructions, the above first method is performed.

In an embodiment of the present disclosure, a base station including a memory and a processor is provided, wherein the memory has computer instructions stored therein, and when the processor executes the computer instructions, the above second method is performed.

Embodiments of the present disclosure may provide following advantages.

At a UE side, embodiments of the present disclosure provide a channel access method, including: receiving configuration information, wherein the configuration information includes configuration information of at least one available bandwidth that is configured to perform an LBT operation, and the at least one available bandwidth is a portion of bandwidth of a carrier; performing the LBT operation on the at least one available bandwidth indicated by the configuration information to listen to a channel; and when the LBT operation on any one of the at least one available bandwidth succeeds, performing uplink data transmission on the available bandwidth to access the channel. Compared with the existing channel access solutions where LBT is achieved based on entire bandwidth of a carrier on an unlicensed band, embodiments of the present disclosure may sufficiently adapt to the concept of partial bandwidth (such as BWP or subband) introduced in the NR system. By providing the channel access method where LBT is achieved based on a portion of bandwidth of a carrier on an unlicensed band, the UE may better meet OCB requirements for transmitted signals on the unlicensed band in the NR system.

Further, each of the at least one available bandwidth is associated with at least one listen direction, and performing the LBT operation on the at least one available bandwidth indicated by the configuration information includes: for each of the at least one available bandwidth, performing the LBT operation in each listen direction associated with the available bandwidth, where the listen direction is determined based on spatial configuration of a reference signal resource configured for the UE. Therefore, after the LBT operation succeeds, the UE may perform uplink transmission based on the spatial configuration of the reference signal resource, so as to access the channel which has been successfully listened to via further interaction with the base station.

Further, at a base station side, embodiments of the present disclosure provide a channel access method, including: determining configuration information based on LBT capability of a UE, and transmitting the configuration information, wherein the configuration information includes configuration information of at least one available bandwidth that is configured for the UE to perform an LBT operation, and the at least one available bandwidth is a portion of bandwidth of a carrier; and in response to receiving uplink data, allowing or rejecting the UE to access a channel to which the uplink data points, wherein the uplink data is transmitted when the LBT operation performed by the UE on any one of the at least one available bandwidth succeeds. Compared with the existing techniques, embodiments of the present disclosure allow the base station to configure for the UE a portion of bandwidth of a carrier as the available bandwidth where the LBT operation is performed by the UE, so as to better adapt to regulations of relevant protocols in the NR system and to cooperate with the UE to achieve channel access with higher efficiency.

Further, the LBT capability of the UE is determined based on LBT capability report information reported by the UE, so as to acquire the LBT capability of the UE more accurately, and allocate the available bandwidth for the UE more reasonably.

DETAILED DESCRIPTION

As described in the background, in Long Term Evolution Licensed Assisted Access (LTE-LAA), after it is successful to listen by adopting the LBT mechanism (hereinafter referred to as "LBT succeeds"), there is no solution for the UE to perform uplink transmission based on spatial configuration of a reference signal resource.

On the other hand, for the LTE system, existing protocols stipulate that nominal bandwidth (Nominal Channel Bandwidth, referred to as NCB) is bandwidth of an entire Component Carrier (CC, hereinafter referred to as carrier) when the UE performs the LBT operation. In the NR (also called new air interface) system, concepts of BWP and subband are introduced. If the bandwidth of the carrier is still used as the NCB, it may be difficult to meet requirements of the OCB of the UE.

To solve the above technical problem, at the UE side, an embodiment of the present disclosure provides a channel access method, including: receiving configuration information, wherein the configuration information includes configuration information of at least one available bandwidth that is configured to perform an LBT operation, and the at least one available bandwidth is a portion of bandwidth of a carrier; performing the LBT operation on the at least one available bandwidth indicated by the configuration information to listen to a channel; and when the LBT operation on any one of the at least one available bandwidth succeeds, performing uplink data transmission on the available bandwidth to access the channel.

Those skilled in the art could understand that the solutions of the embodiments of the present disclosure can sufficiently adapt to the concept of partial bandwidth (such as BWP or subband) introduced in the NR system. By providing the channel access method where LBT is achieved based on a portion of bandwidth of a carrier on an unlicensed band, the UE may better meet OCB requirements for transmitted signals on the unlicensed band in the NR system.

In order to clarify the objects, characteristics and advantages of the disclosure, embodiments of present disclosure will be described in detail in conjunction with accompanying drawings.

Figure 1:
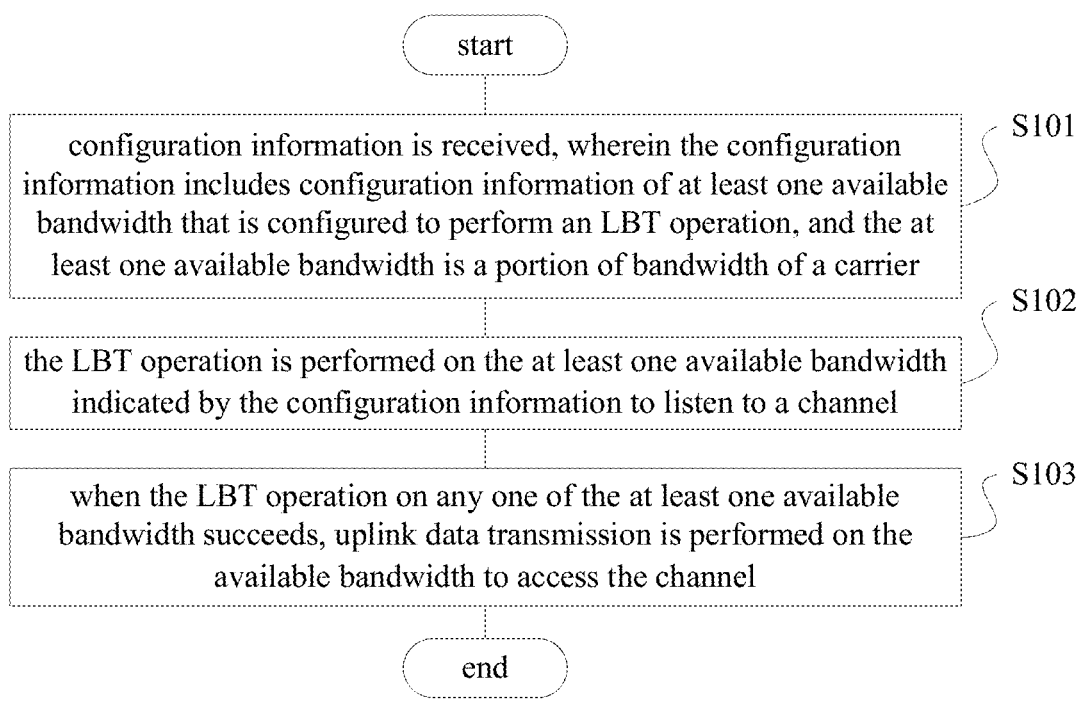
FIG. 1 is a flow chart of a channel access method according to an embodiment.

FIG. 1 is a flow chart of a channel access method according to an embodiment. The method may be applied at a UE side, e.g., performed by a UE. The method may be applied in a channel access scenario where LBT is achieved based on a portion of bandwidth of a carrier on an unlicensed band. Further, with the method, after the LBT succeeds, uplink transmission may be performed based on spatial configuration of a reference signal resource, so as to access a channel which has been successfully listened to.

For NR systems, unlicensed bands include two types, Standalone LAA (SALAA) and Non-standalone LAA (NSA LAA). Differences between the two types lie in that the latter may be configured with a licensed primary cell (PCell) to assist in transmission of some channels, reference channels or configuration information.

It should be noted that the method provided in embodiments of the present disclosure may be applied to both SA LAA and NSA LAA scenarios.

Referring to FIG. 1, the method may include S101, S102 and S103.

In S101, configuration information is received, wherein the configuration information includes configuration information of at least one available bandwidth that is configured to perform an LBT operation, and the at least one available bandwidth is a portion of bandwidth of a carrier.

In S102, the LBT operation is performed on the at least one available bandwidth indicated by the configuration information to listen to a channel.

In S103, when the LBT operation on any one of the at least one available bandwidth succeeds, uplink data transmission is performed on the available bandwidth to access the channel.

In some embodiments, the at least one available bandwidth is selected from a group consisting of BWP and subband. The BWP is a portion of bandwidth of the carrier, and the subband may be bandwidth of the BWP or a portion of bandwidth of the carrier.

In some embodiments, a base station may instruct the UE to perform the LBT operation in the unit of BWP or bandwidth of a subband via the configuration information.

In some embodiments, a size of the bandwidth of the subband and/or a frequency domain position of the sub-band may be pre-configured by the base station through a high-layer signaling, a Media Access Control-Control Element (MAC-CE) or a Physical Downlink Control Channel (PDCCH).

For example, the high-level signaling may be an RRC signaling.

It can be understood that the above examples are only for those skilled in the art to better understand and implement the present disclosure, and do not limit the present disclosure in any way. According to the definition of future protocols, the available bandwidth may also be selected from other newly defined concepts. No matter what concept is used by those skilled in the art as the available bandwidth, any bandwidth obtained using a portion of the bandwidth of the carrier as a division standard may serve as the available bandwidth in the embodiments.

In some embodiments, before S101, the method further includes: before receiving the configuration information, transmitting LBT capability report information, wherein the LBT capability report information indicates the number of the at least one available bandwidth that is configured to perform the LBT operation.

That is, the UE may report to the base station in advance the number of the at least one available bandwidth that supports performing the LBT operation, so that the base station can determine LBT capability of the UE.

In some embodiments, the LBT capability report information is selected from a group consisting of: the number of one or more available bandwidths for the LBT operation simultaneously performed on one carrier; the number of one or more available bandwidths for the LBT operation simultaneously performed on a plurality of carriers; the number of one or more available bandwidths for the LBT operation performed on one carrier; and the number of one or more available bandwidths for the LBT operation performed on a plurality of carriers.

In some embodiments, the carrier may be pre-configured for the UE by the base station. In some embodiments, the base station may configure one or more carriers for the UE, that is, the UE may be associated with one or more carriers.

The number of one or more available bandwidths for the LBT operation performed on one carrier may be the number of one or more available bandwidths for the LBT operation performed on the one carrier successively or simultaneously. For example, the number of the one or more available bandwidths is five, where on the carrier, three available bandwidths are used for performing LBT operation simultaneously, and the other two available bandwidths are used for performing LBT operation before or after that performed on the three available bandwidths.

In some embodiments, the UE may be associated with five carriers. The LBT capability report information reported by the UE may include the number of available bandwidths for the LBT operation performed on one of the five carriers simultaneously, and the number of available bandwidths for the LBT operation performed on the five carriers. That is, two numbers are reported, so that the base station can make a choice flexibly.

Alternatively, the LBT capability report information may include the number of available bandwidths for the LBT operation performed on each of the five carriers simultaneously. That is, five numbers are reported.

Further, by reporting the number of available bandwidths for the LBT operation performed by the UE, the UE can receive the configuration information from the base station, and determine an actual number of available bandwidths allocated by the base station and a position of a corresponding link.

In some embodiments, the LBT capability report information may be carried by a high-layer signaling, such as an RRC signaling.

Alternatively, the LBT capability report information may be carried by a Physical uplink Control Channel (PUCCH), a Physical Uplink Shared Channel (PUSCH) or a MAC-CE.

In some embodiments, the number of available bandwidths for the LBT operation performed on one carrier simultaneously may include the number MaxLBTBWP of BWPs for the LBT operation performed on one carrier simultaneously.

For example, in the LBT capability report information, MaxLBTBWP may be described by following expression, MaxLBTBWP INTEGER::=M, where M is a value of MaxLBTBWP, and may be 1, 2, 3, 4 or other positive integer.

In some embodiments, the number of available bandwidths for the LBT operation performed on one carrier simultaneously may include the number MaxLBTSubband of subbands for the LBT operation performed on one carrier simultaneously.

For example, in the LBT capability report information, MaxLBTSubband may be described by following expression, MaxLBTSubband INTEGER::=M, where M is a value of MaxLBTSubband, and may be 1, 2, 3, 4 or other positive integer.

In some embodiments, the number of available bandwidths for the LBT operation performed on multiple carriers simultaneously may include the number MaxLBTBWP of BWP for the LBT operation performed on multiple carriers simultaneously.

For example, in the LBT capability report information, MaxLBTBWP may be described by following expression, MaxLBTBWP INTEGER::=M, where M is a value of MaxLBTBWP, and may be 1, 2, 3, 4 or other positive integer.

In some embodiments, the number of available bandwidths for the LBT operation performed on multiple carriers simultaneously may include the number MaxLBTSubband of subbands for the LBT operation performed on multiple carriers simultaneously.

For example, in the LBT capability report information, MaxLBTSubband may be described by following expression, MaxLBTSubband INTEGER::=M, where M is a value of MaxLBTSubband, and may be 1, 2, 3, 4 or other positive integer.

In some embodiments, the number of available bandwidths for the LBT operation performed on one carrier may include the number MaxLBTBWP of BWPs for the LBT operation performed on one carrier.

For example, in the LBT capability report information, MaxLBTBWP may be described by following expression, MaxLBTBWP INTEGER::=M, where M is a value of MaxLBTBWP, and may be 1, 2, 3, 4 or other positive integer.

In some embodiments, the number of available bandwidths for the LBT operation performed on one carrier may include the number MaxLBTSubband of subbands for the LBT operation performed on one carrier.

For example, in the LBT capability report information, MaxLBTSubband may be described by following expression, MaxLBTSubband INTEGER::=M, where M is a value of MaxLBTSubband, and may be 1, 2, 3, 4 or other positive integer.

In some embodiments, the number of available bandwidths for the LBT operation performed on multiple carriers may include the number MaxLBTBWP of BWPs for the LBT operation performed on multiple carriers.

For example, in the LBT capability report information, MaxLBTBWP may be described by following expression, MaxLBTBWP INTEGER::=M, where M is a value of MaxLBTBWP, and may be 1, 2, 3, 4 or other positive integer.

In some embodiments, the number of available bandwidths for the LBT operation performed on multiple carriers may include the number MaxLBTSubband of subbands for the LBT operation performed on multiple carriers.

For example, in the LBT capability report information, MaxLBTSubband may be described by following expression, MaxLBTSubband INTEGER::=M, where M is a value of MaxLBTSubband, and may be 1, 2, 3, 4 or other positive integer.

In some embodiments, the step of transmitting the LBT capability report information may be omitted, and the base station may configure the number (for example, 1) and specific frequency domain positions of one or more available bandwidths for the UE by default based on capability (such as busyness and idleness) of the base station.

Alternatively, the base station may acquire device capability of the UE based on signaling generated during previous interaction with the UE, and further determine the LBT capability of the UE, so as to more reasonably configure the number and specific frequency domain positions of available bandwidths for the UE.

In some embodiments, the UE provides candidate available bandwidths to the base station via the LBT capability report information, and the base station selects, from the candidate available bandwidths, one or more available bandwidths for the UE to perform the LBT operation, and indicates to the UE via the configuration information.

In some embodiments, the configuration information may be received via a primary cell. In some embodiments, the primary cell may be a licensed cell.

In some embodiments, the configuration information may be selected from a group consisting of: position indication information of the at least one available bandwidth; type indication information of LBT; spatial configuration indication information of LBT, used to indicate the listen direction where the LBT operation is performed; indication information of a channel access level; and activation indication information of LBT and timer indication information.

Concepts and functions of the above information are described in detail below.

The position indication information of the at least one available bandwidth may include configuration indication information such as bandwidth occupied by the at least one available bandwidth and a frequency domain position of the at least one available bandwidth.

For example, the position indication information of the at least one available bandwidth may include sequence number indication information (that is, sequence number) of BWP used to perform the LBT operation, and may also include indication information indicating bandwidth occupied by each BWP and a corresponding frequency domain position. The indication information of the frequency domain position may include a frequency domain start position and/or a BWP center frequency point position.

In some embodiments, the sequence number indication information of the BWP used to perform the LBT operation may be associated with one or more BWP.

A corresponding RRC signaling may be described by following expression:

BWP_LBT_id BIT STRING(size(M)), where BWP_LBT_id is a sequence number of the BWP used to perform the LBT operation, BIT STRING is a bit string obtained by numerical conversion corresponding to the sequence number, and size(M) indicates that the bit string includes M bits.

The sequence number BWP_LBT_id of each BWP used to perform the LBT operation may include one or more of following indication information:

BWP_start BIT STRING(size(M));

BWP_end BIT STRING(size(M));

BWP_bandwidth BIT STRING(size(M));

BWP_center BIT STRING(size(M)), where BWP_start is a frequency domain start position of the BWP, BWP_end is a frequency domain end position of the BWP, BWP_bandwidth is the bandwidth occupied by the BWP, and BWP_center is a position of a center frequency point of the BWP.

In some embodiments, the UE may pre-store a relationship table which records an association relationship between a sequence number of BWP used to perform the LBT operation and a bandwidth and a frequency domain position occupied by the BWP. Therefore, the position indication information of the one or more available bandwidths transmitted to the UE via the configuration information may include merely a sequence number of BWP used to perform the LBT operation. In response to receiving the configuration information, the UE may search the relationship table based on the sequence number of BWP to determine the bandwidth and frequency domain position occupied by each of the one or more BWPs configured for the UE.

In some embodiments, the position indication information of the available bandwidth may include sequence number indication information (i.e., sequence number) of subband used to perform the LBT operation, and indication information indicating a bandwidth and a frequency domain position occupied by each subband. The indication information of the frequency domain position may include a frequency domain start position and/or a position of a center frequency point of the subband. The subband may be a partial bandwidth inside the BWP or a partial bandwidth inside the carrier.

In some embodiments, the sequence number indication information of subband used to perform the LBT operation may be associated with one or more subbands.

In some embodiments, the sequence number indication information of subband may correspond to carriers in one-to-one correspondence.

A corresponding RRC signaling may be described by following expression:

BWP_Subband_id BIT STRING(size(M)); or

CC_Subband_id BIT STRING(size(M)), where BWP_Subband_id is a sequence number of a subband used to perform the LBT operation when the subband is a partial bandwidth inside a BWP, and CC_Subband_id is a sequence number of a subband used to perform the LBT operation when the subband is a partial bandwidth inside a carrier, BIT STRING is a bit string obtained by numerical conversion corresponding to the sequence number, and size(M) indicates that the bit string includes M bits.

For each BWP_Subband_id or CC_Subband_id, one or more of following indication information may be included:

Subband_start BIT STRING(size(M));

Subband_end BIT STRING(size(M));

Subband_bandwidth BIT STRING(size(M));

Subband_center BIT STRING(size(M)), where Subband_start is a frequency domain start position of the subband, Subband_end is a frequency domain end position of the subband, Subband_bandwidth is a bandwidth occupied by the subband, and Subband_center is a position of a center frequency point of the subband.

In some embodiments, if the LBT capability report information reported by the UE is the number of BWPs, the base station may allocate one or more subbands within one or more BWPs for the UE to perform the LBT operation. Therefore, the position indication information of the available bandwidth may include sequence numbers of the one or more BWPs and the one or more sub-bands used to perform the LBT operation, and their respective bandwidths and frequency domain positions.

Alternatively, the base station may allocate one or more subbands within a carrier for the UE to perform the LBT operation. Therefore, the position indication information of the available bandwidth may include sequence numbers of the carrier (as the UE may be associated with multiple carriers) and the one or more subbands used to perform the LBT operation, and their respective bandwidths and frequency domain positions.

The type indication information of LBT may include a type of LBT (referred to as LBT type) corresponding to each available bandwidth (such as BWP or subband) allocated to the UE, where multiple available bandwidths may correspond to a same LBT type.

According to existing protocols, optional LBT types may include: LBT Type 1 similar to LTE-LAA uplink (UL) and LTE LAA downlink (DL) LBT, LBT Type 2 similar to LTE-LAA UL, omnidirectional LBT (also called non-directional LBT, non-beam-based LBT or non-spatial-configuration-of-reference-signal-resource-based LBT), directional LBT (also called non-omnidirectional LBT, beam-based LBT or spatial-configuration-of-reference-signal-resource-based LBT; unidirectional LBT (also called spatial-configuration-of-single-reference-signal-resource-based LBT or single-beam-based LBT); multidirectional LBT (also called spatial-configuration-of-multiple-reference-signal-resource-based LBT or multiple-beam-based LBT).

It could be understood that the above examples are only for those skilled in the art to better understand and implement the present disclosure, and do not limit the present disclosure. Other LBT types newly defined in future protocols may also be applicable to the optional LBT types in the configuration information described in the above embodiments.

In some embodiments, a bit string may be used to distinguish the above two or more types, and the corresponding LBT may be associated with a specific BWP or subband.

For example, when the configuration information includes multiple available bandwidths, different available bandwidths may be assigned with different LBT types. Alternatively, some of the available bandwidths may employ a same LBT type.

In some embodiments, for a scenario where merely two LBT types need to be distinguished, boolean may be used for the distinguishing.

In some embodiments, the type indication information of LBT may be associated with a carrier. That is, the available bandwidths indicated in the configuration information that belong to a same carrier adopt the LBT type indicated by the type indication information of LBT which is associated with the carrier.

In some embodiments, the type indication information of LBT may be associated with the UE. That is, all available bandwidths configured for the UE adopt the LBT type indicated by the type indication information of LBT which is associated with the UE.

The spatial configuration indication information of LBT may include spatial configuration information of a listen direction in which the LBT operation is performed, and the spatial configuration information of the listen direction may indicate spatial configuration shared with a specific reference signal (RS) resource.

In some embodiments, the RS resources correspond to spatial configuration directions of the reference signal resource in one-to-one correspondence. Therefore, the listen direction may be determined based on the RS resource.

Based on the spatial configuration indication information of LBT, the UE may perform the LBT operation based on a transmission mode of the spatial configuration information of the reference signal resource, and then perform uplink data transmission in a spatial configuration direction of the reference signal resource in which direction the LBT operation has succeeded.

With reference to relevant regulations in existing protocols regarding a process of performing spatial configuration management of uplink and downlink reference signal resources on licensed bands in a 5G NR system, the spatial configuration indication information of LBT may include spatial configuration indication information of LBT of BWP or sub-band, to specify that the LBT used on one or more BWPs or subbands allocated to the UE needs to use same spatial configuration as a specified RS resource.

The same spatial configuration may be replaced by transmission (Tx) related spatial configuration or reception (Rx) related spatial configuration of the same reference signal resource, or the Tx spatial configuration and the Rx spatial configuration have a beam correspondence relationship, a same quasi co-location (QCL) relationship or a QCL Type-D relationship, of spatial configuration of the reference signal resource. The QCL Type-D information of the RS resource may indicate spatial configuration of a listen direction in which the UE performs the LBT operation on an associated BWP or subband.

In some embodiments, when the configuration information is associated with multiple available bandwidths (such as BWPs or subbands), the multiple available bandwidths may be within bandwidth of a same carrier or within bandwidths of multiple carriers.

In some embodiments, the multiple available bandwidths may be associated with spatial configuration indication information of different independent LBT, respectively. Alternatively, the multiple available bandwidths may use spatial configuration indication information of a same LBT.

In some embodiments, the RS resource may include: a Synchronization Signal/Physical Broadcast Channel block (SS/PBCH block or SSB); a Channel State Information Reference Signal (CSI-RS) resource; a Sounding Reference Signal (SRS) resource; or Demodulated Reference Signal (DRS) resource.

Details of each resource can be referred to relevant regulations in the existing protocols (including LTE and NR systems), and are not described here.

Therefore, in NR-LAA, LBT rules specifically for DRS resources (sets), SSB resources, CSI-RS resources (sets), and SRS resources (sets) may be defined based on the spatial configuration indication information of LBT.

Further, the spatial configuration indication information of LBT may include spatial configuration indication information of LBT of a carrier, to specify that the LBT used on one or more carriers allocated to the UE needs to use same spatial configuration as a specified RS resource.

Further, the spatial configuration indication information of LBT may include spatial configuration indication information of LBT of the UE, to specify that the LBT used on all carriers allocated to the UE needs to use same spatial configuration as a specified RS resource.

The QCL Type-D information of the RS resource may indicate the spatial configuration information of the listen direction in which the UE performs the LBT operation on the associated carrier.

When multiple available bandwidths indicated by the configuration information are located on multiple carriers, the multiple carriers may be independently associated with independent spatial configuration indication information. Alternatively, the multiple carriers may be associated with spatial configuration indication information of the same reference signal resource.

The indication information of the channel access level may be used by the UE to determine the channel access level (also called channel access priority) of the BWP, subband or carrier allocated by the base station, or the channel access levels of all available bandwidths allocated to the UE.

The channel access level may indicate parameters (such as a first preset duration and an upper limit value of a preset range) that the UE needs to use when performing the LBT operation on the associated available bandwidth.

The first preset duration (such as a defer duration Td defined in the existing protocols) indicates a channel detection duration of the UE during the execution of the LBT operation. The preset range includes candidates of a count value required when performing the LBT operation, where the count value is used to indicate whether to listen to the channel in the listen direction associated with the available bandwidth.

TABLE 1

| p | mp | CWmin, p | CWmax, p | Tmcot, p | Available values of CWp |
|---|----|----------|----------|----------|-------------------------|
| 1 | 1  | 3        | 7        | 2 ms     | {3, 7}                  |
| 2 | 1  | 7        | 15       | 3 ms     | {7, 15}                 |
| 3 | 3  | 15       | 63       | 8 or 10 ms | {15, 31, 63}         |
| 4 | 7  | 15       | 1023     | 8 or 10 ms | {15, 31, 63, 127, 255, 511, 1023} |

Take the channel access level in downlink as an example, referring to Table 1, p is the channel access level, mp is used to determine the first preset duration corresponding to the p-th level, CWmin,p and CWmax,p are upper and lower limits of the upper limit value of the preset range corresponding to the p-th level, based on which CWp can be defined, i.e., available values of the upper limit value of the preset range of the p-th level optional for the base station Value, and Tmcot,p is a maximum transmission duration of an uplink or downlink transmission.

Further, Table 1 may be pre-transmitted by the base station to the UE via a high-level signaling or may be predefined. In practice, the base station only needs to indicate the channel access level p of the available bandwidth (and/or carrier and/or UE) allocated to the UE this time in the indication information of the channel access level, and the UE may look up the table 1 to determine corresponding parameters to perform the LBT operation and subsequent data transmission operations.

It could be understood that the specific values of the parameters listed in Table 1 are merely for illustrative examples. In practice, those skilled in the art can adjust specific values of the parameters based on requirements.

In some embodiments, the configuration information may include multiple indication information of channel level to associate different minimum units.

In some embodiments, the configuration information may be carried by a higher layer signaling (such as RRC), a PDCCH, DCI or an MAC-CE bearer, where PDCCH may be scheduled to transmit DCI.

For example, the base station configures 5 available bandwidths for the UE, of which 3 available bandwidths are disposed on a same carrier (denoted as carrier 1), and the other 2 available bandwidths (denoted as available bandwidth 1 and available bandwidth 2) are disposed on 2 different carriers, respectively. The base station may also indicate three indication information of channel level through the configuration information. One indication information of channel level is associated with the carrier 1, thus, when the LBT operations are performed on the three available bandwidths that are disposed on the carrier 1, the LBT operations may be performed based on the parameters in Table 1 associated with the indication information of channel level of the carrier 1. The second and third indication information of channel level are associated with the available bandwidth 1 and the available bandwidth 2, thus, when the LBT operation is performed on the available bandwidth 1, the LBT operation may be performed based on the parameters in Table 1 associated with the indication information of channel level of the available bandwidth 1, and when the LBT operation is performed on the available bandwidth 2, the LBT operation may be performed based on the parameters in Table 1 associated with the indication information of channel level of the available bandwidth 2.

The timer indication information may be used by the UE to determine an activation duration of the LBT function on the available bandwidth. That is, the timer indication information indicates the maximum duration to use the LBT function on the associated available bandwidth. Once the duration ends (or after the timer expires), the UE stops performing the LBT operation on the available bandwidth.

In some embodiments, the bandwidth applicable to the timer may be one of the following situations: 1 BWP on one CC, multiple BWPs on one CC, 1 subband on one CC, multiple subbands on one CC, and BWPs on multiple CCs.

In some embodiments, an effective time of the timer may be activated by MAC-CE.

Alternatively, the effective time of the timer may be activated by a higher layer signaling.

Alternatively, the effective time of the timer may be activated by a PDCCH.

Alternatively, the effective time of the timer may be triggered by one of the following events:

the UE performing an uplink LBT operation, where a time for the uplink LBT operation may be configured by the base station via a high-level signaling (such as RRC), a PDCCH or a MAC-CE; and the UE receiving scheduling indication information from the base station, where a transmission resource indicated may be a PUCCH, a PUSCH, an SRS or a PDSCH.

Alternatively, the effective time of the timer may be a time when the UE receives the scheduling indication information from the base station.

Alternatively, the effective time of the timer may start from a time-domain position of the UE on a scheduled resource indicated by the base station.

For example, the UE receives the indication information from the base station which indicates that the timer starts to take effect after K time of receiving the indication information. The indication information may be carried by a higher layer signaling, a MAC-CE or a PDCCH. The unit of K may be a slot, a symbol, a radio frame or a millisecond.

The activation indication information of LBT may be used by the UE to determine whether to activate the LBT function on the associated available bandwidth.

In some embodiments, the activation indication information may be a boolean (i.e., 0 or 1) to indicate activation (1) or deactivation (0) of the LBT function on the BWP/subband indicated by the activation indication information.

In some embodiments, the activation indication information may further include timing offset information to indicate that the LBT function on the corresponding BWP/subband is activated or deactivated only after a time indicated by the timing offset information arrives. That is, the timing offset information may indicate an activation effective time or a deactivation effective time of the LBT function. In some embodiments, a reference point of the timing offset may be a time point of receiving a high-level signaling (such as RRC) carrying the activation indication information.

Therefore, the deactivation indication information in the above activation indication information may be combined with the timer indication information into one piece of information. That is, the configuration information may include the activation indication information and the timer indication information to indicate start and end times of the LBT operation.

In some embodiments, the effective time of the timer indicated by the timer indication information may be counted from a time when the higher layer signaling carrying the information is received.

For example, the timer indication information may include 10 ms.

In some embodiments, the timer indication information may be combined with the timing offset information, that is, the configuration information may include the timer indication information and the deactivation indication information to indicate start and end times of the LBT operation.

In some embodiments, after the time indicated by the timer indication information expires, the UE may feed back a situation to the base station via a PUCCH, a PUSCH, a MAC-CE or a high-level signaling to trigger other possible processes. For example, the base station may reconfigure configuration information for the UE to continue performing the LBT operation.

In some embodiments, a dedicated field may be used in Uplink Control Information (UCI) to report a sequence number that exceeds an available bandwidth of the timer. The UCI may be carried by a licensed Pcell or Secondary cell (Scell).

In some embodiments, a dedicated field may be used in the UCI to report a timer timeout behavior.

In some embodiments, a Boolean indicator may be used to indicate whether there is a timer timeout behavior. For example, 0 represents no timeout, 1 represents timeout; or, 1 represents timeout, and 0 represents timeout, where UCI may be carried by a licensed Pcell or Scell.

In some embodiments, the activation indication information and the timer indication information may be associated with the carrier or the UE, that is, for all available bandwidths located in the carrier among the available bandwidths allocated to the UE or for all the available bandwidths allocated to the UE, the activation time and duration are determined based on the same activation indication information and timer indication information.

In some embodiments, in S103, the data transmitted in the uplink data transmission may include scheduling information, and the scheduling information may include PUCCH, PUSCH or SRS.

For example, according to the configuration information, the UE performs the LBT operation on the at least one available bandwidth indicated by the base station. When the LBT operation on any one of the at least one available bandwidth succeeds, the UE may transmit the scheduling information on the available bandwidth.

In some embodiments, each of the at least one available bandwidth is associated with at least one listen direction (indicated by spatial configuration indication information of LBT) that is determined based on spatial configuration of a reference signal resource. For example, the available bandwidth may employ spatial configuration same as an associated reference signal resource, or, the available bandwidth and the associated reference signal resource have same QCL configuration, or, the available bandwidth and the associated reference signal resource have same QCL configuration of type-D.

Accordingly, S102 may include: for each of the at least one available bandwidth, performing the LBT operation in each listen direction associated with the available bandwidth.

Figure 2:
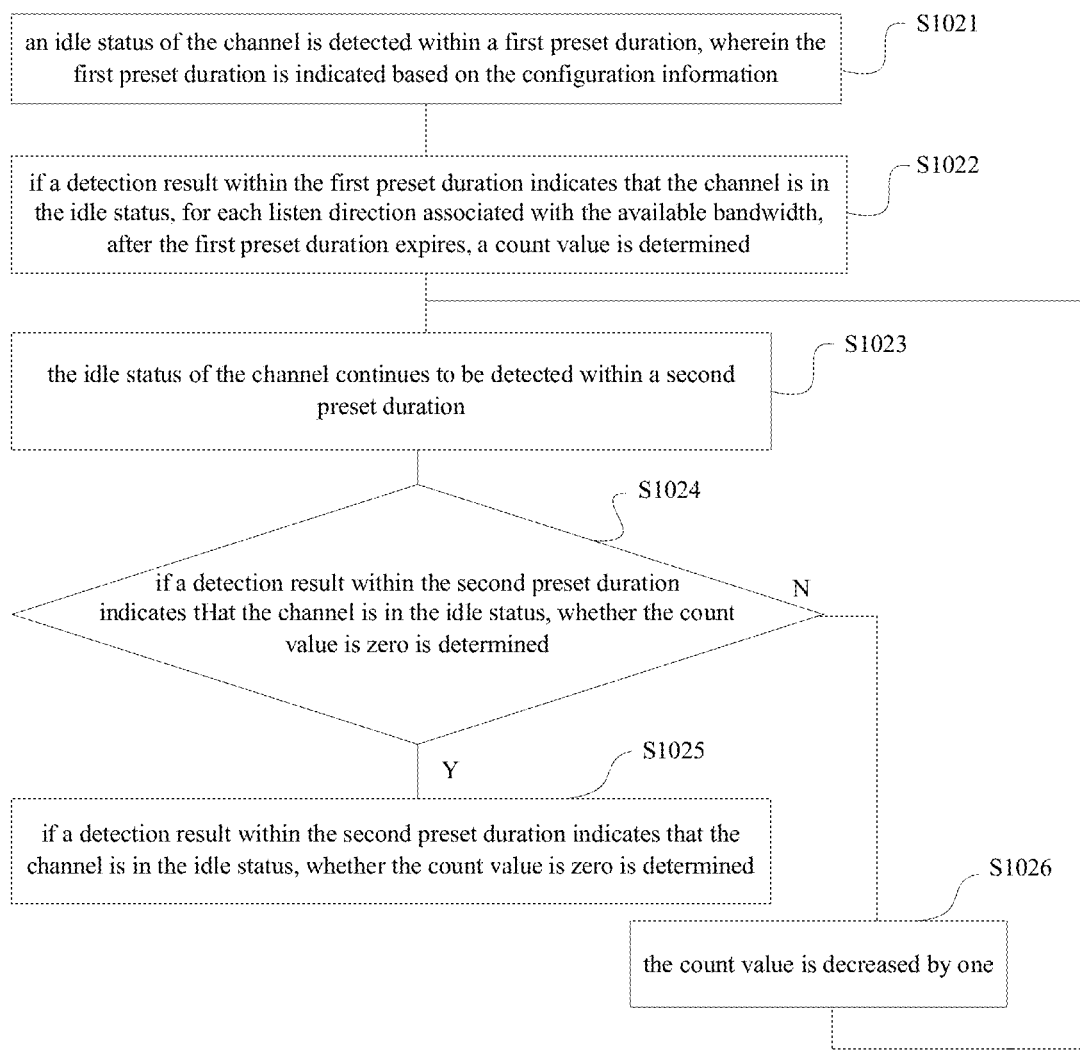
FIG. 2 is a flow chart of S102 in the method as shown in FIG. 1.

Referring to FIG. 2, in some embodiments, for each of the at least one available bandwidth, performing the LBT operation in each listen direction associated with the available bandwidth includes S1021, S1022, S1023, S1024, S1025 and S1026.

In S1021, an idle status of the channel is detected within a first preset duration, wherein the first preset duration is indicated based on the configuration information. For example, the first preset duration is determined based on the indication information of channel access level.

In S1022, if a detection result within the first preset duration indicates that the channel is in the idle status, for each listen direction associated with the available bandwidth, after the first preset duration expires, a count value is determined, wherein the count value indicates whether to listen to the channel in the listen direction associated with the available bandwidth, and is a random number selected from a preset range which is determined based on a preset value and the configuration information (such as the included indication information of channel access level).

In S1023, the idle status of the channel continues to be detected within a second preset duration. The second preset duration may be predefined and prestored in the UE, for example, being determined by a protocol.

In S1024, if a detection result within the second preset duration indicates that the channel is in the idle status, whether the count value is zero is determined.

If the count value is zero, S1025 is performed. In S1025, it is determined that the LBT operation in the listen direction associated with the available bandwidth succeeds.

If the count value is not zero, S1026 is performed. In S1026, the count value is decreased by one, and S1024 is performed again, to continue detecting the idle status of the channel within the second preset duration until the detection result within the second preset duration indicates that the channel is in the idle status.

In some embodiments, the configuration information may include configuration information of one available bandwidth, and the spatial configuration indication information of the LBT indicated to the available bandwidth includes merely one RS resource. Accordingly, the UE only performs the LBT operation in a spatial configuration direction of one reference signal resource of the available bandwidth, and the spatial configuration direction of the reference signal resource is associated with the RS resource.

In some embodiments, a detailed process for the UE to perform the LBT operation may be referred to related regulations of LTE, and is not described in detail here.

In some embodiments, the configuration information may include configuration information of one available bandwidth, and the spatial configuration indication information of the LBT in the configuration information of the available bandwidth includes multiple RS resources. Accordingly, the UE may simultaneously perform the LBT operation in a spatial configuration direction of the multiple reference signal resources of the available bandwidth, and spatial configuration of beam directions is determined by the RS resources respectively, that is, the spatial configuration information of the LBT is determined based on spatial resource configuration of its associated reference signal resource.

In some embodiments, it is first necessary to detect whether the channel is in an idle status during all slot durations within the first preset duration (defer duration Td). When the channel is idle within the first preset duration, the LBT operation is performed after the first preset duration expires; otherwise, S1021 is repeatedly performed until the detection result of the channel within the first preset duration is that the channel is in the idle status.

In some embodiments, when the detection result of S1021 indicates that the channel is idle within the first preset duration, for the spatial configuration direction of each reference signal resource of the available bandwidth indicated by the configuration information, subsequent processes as shown in FIG. 2 continue to be performed, so as to perform LBT operation in the spatial configuration direction of each reference signal resource of the available bandwidth.

In S1022, for the spatial configuration direction of each reference signal resource, assume Ni=Ninit, where Ninit is a uniformly distributed random number taken from the preset range [0, CW], CW is a configuration parameter related to a priority transmitted on NR-LAA by the UE and is configured by the base station to the UE via a high-level signaling, i is the spatial configuration direction of the reference signal resource, Ni is a count value of the spatial configuration direction of the i-th reference signal resource, and the preset value is 0. Those skilled in the art may adjust the preset value based on requirements.

For example, after determining the channel access level associated with the available bandwidth, the base station may select a value from available values of CWp associated with the channel access level listed in Table 1 as the CW of the available bandwidth, and indicate to the UE via the indication information of the channel access level.

In S1023, for each beam direction, the idle status of the channel continues to be listened within the second preset duration (defined as a parameter "additional slot duration" in a protocol) until the channel is idle, and then S1024 is performed.

In S1024, if the count value Ni corresponding to the spatial configuration direction of the i-th reference signal resource where the idle status of the channel is detected is 0, S1025 may be performed, that is, the LBT operation succeeds in the spatial configuration direction of the i-th reference signal resource in the available bandwidth.

If the count value Ni corresponding to the spatial configuration direction of the i-th reference signal resource where the idle status of the channel is detected is greater than 0, the UE may determine whether to decrease the count value by 1, and S1023 is performed repeatedly until the detection result of S1024 is positive.

In some embodiments, for different spatial configuration directions of reference signal resources, the count values obtained from the preset range may be different.

In some embodiments, if the UE succeeds in LBT operation in the spatial configuration direction of more than 1 reference signal resources at the same time, the UE may perform one of the following.

For example, the UE may randomly select a reference signal resource with a successful LBT operation, and use spatial configuration corresponding to the reference signal resource to perform subsequent transmission of information. Alternatively, the UE may determine spatial configuration information used in the subsequent transmission based on other indication information of the base station. The subsequent transmission may include PUCCH transmission, PUSCH transmission or SRS transmission.

For another example, the UE may select a reference signal resource corresponding to a minimum (or maximum) value of Ninit among the reference signal resources with successful LBT operation, and use spatial configuration corresponding to the reference signal resource for the subsequent information transmission. Alternatively, the UE may determine spatial configuration information used in the subsequent transmission based on other indication information of the base station. The subsequent transmission may include PUCCH transmission, PUSCH transmission or SRS transmission.

For another example, the UE may select a reference signal resource with a minimum sequence number among the reference signal resources with successful LBT operation, and use spatial configuration corresponding to the reference signal resource for the subsequent information transmission. Alternatively, the UE may determine spatial configuration information used in the subsequent transmission based on other indication information of the base station. The subsequent transmission may include PUCCH transmission, PUSCH transmission or SRS transmission.

For another example, the UE may select a reference signal resource with a maximum sequence number among the reference signal resources with successful LBT operation, and use spatial configuration corresponding to the reference signal resource for the subsequent information transmission. Alternatively, the UE may determine spatial configuration information used in the subsequent transmission based on other indication information of the base station. The subsequent transmission may include PUCCH transmission, PUSCH transmission or SRS transmission.

In some embodiments, the configuration information may include configuration information of multiple available bandwidths, wherein spatial configuration indication information of the LBT in the configuration information of each available bandwidth includes merely one RS resource. Accordingly, the UE may simultaneously perform the LBT operation in the spatial configuration direction of one reference signal resource corresponding to each of the multiple available bandwidths. For each available bandwidth, the spatial configuration direction of the reference signal resource is associated with the RS resource indicated to the available bandwidth.

In the embodiment, it is possible to perform the LBT operation in the spatial configuration direction of the reference signal resource corresponding to each available bandwidth based on the process as shown in FIG. 2, and details can be referred to the above descriptions and are not described here. Differences from the above embodiment lie in that, as there is merely one RS resource associated listen direction on each available bandwidth, in the embodiment, the LBT operation is performed in a direction of the RS resource of each available bandwidth, where Ni indicates the count value of the i-th available bandwidth.

In some embodiments, if the UE succeeds in LBT on more than 1 available bandwidths at the same time, the UE may perform one of the following.

For example, the UE may randomly select an available bandwidth among available bandwidths with a successful LBT operation, and use spatial configuration of a reference signal resource associated with the available bandwidth to perform subsequent transmission of information. Alternatively, the UE may determine spatial configuration information used in the subsequent transmission based on other indication information of the base station. The subsequent transmission may include PUCCH transmission, PUSCH transmission or SRS transmission.

For another example, the UE may select an available bandwidth with a minimum sequence number among available bandwidths with a successful LBT operation, and use spatial configuration of the reference signal resource associated with the available bandwidth to perform the subsequent information transmission. Alternatively, the UE may determine spatial configuration information used in the subsequent transmission based on other indication information of the base station. The subsequent transmission may include PUCCH transmission, PUSCH transmission or SRS transmission.

For another example, the UE may select an available bandwidth with a maximum sequence number among the available bandwidths with a successful LBT operation, and use spatial configuration corresponding to the reference signal resource associated with the available bandwidth to perform the subsequent information transmission. Alternatively, the UE may determine spatial configuration information used in the subsequent transmission based on other indication information of the base station. The subsequent transmission may include PUCCH transmission, PUSCH transmission or SRS transmission.

For another example, the UE may select a reference signal resource with a minimum sequence number among the available bandwidths with a successful LBT operation, and use spatial configuration corresponding to the reference signal resource for the subsequent information transmission. Alternatively, the UE may determine spatial configuration information used in the subsequent transmission based on other indication information of the base station. The subsequent transmission may include PUCCH transmission, PUSCH transmission or SRS transmission.

For another example, the UE may select a reference signal resource with a maximum sequence number among the available bandwidths with a successful LBT operation, and use spatial configuration corresponding to the reference signal resource for the subsequent information transmission. Alternatively, the UE may determine spatial configuration information used in the subsequent transmission based on other indication information of the base station. The subsequent transmission may include PUCCH transmission, PUSCH transmission or SRS transmission.

For another example, the UE may select an available bandwidth corresponding to a minimum value of Ninit among the available bandwidths with a successful LBT operation, and use spatial configuration of the reference signal resource associated with the available bandwidth for the subsequent information transmission. Alternatively, the UE may determine spatial configuration information used in the subsequent transmission based on other indication information of the base station. The subsequent transmission may include PUCCH transmission, PUSCH transmission or SRS transmission.

For another example, the UE may select an available bandwidth corresponding to a maximum value of Ninit among the available bandwidths with a successful LBT operation, and use spatial configuration of the reference signal resource associated with the available bandwidth for the subsequent information transmission. Alternatively, the UE may determine spatial configuration information used in the subsequent transmission based on other indication information of the base station. The subsequent transmission may include PUCCH transmission, PUSCH transmission or SRS transmission.

In some embodiments, the configuration information may include configuration information of multiple available bandwidths, wherein the spatial configuration indication information of the LBT in the configuration information of each available bandwidth includes multiple RS resources. Accordingly, the UE may simultaneously perform the LBT operation in the spatial configuration direction of the multiple reference signal resources corresponding to the multiple available bandwidths. For each available bandwidth, the spatial configuration directions of the reference signal resources and the RS resources indicated to the available bandwidth correspond to each other, respectively.

In the embodiment, it is possible to perform the LBT operation in the spatial configuration direction of each reference signal resource of each available bandwidth based on the process as shown in FIG. 2, and details can be referred to the above descriptions, and are not described here. Difference from the above embodiments lie in that, as each available bandwidth includes listen directions associated with multiple RS resources, in the embodiment, the LBT operation is performed in all the directions of RS resources indicated in each available bandwidth. Accordingly, in the embodiment, the count value Ni may be more reasonably expressed as Nij, to indicate the count value of the spatial configuration direction of the i-th reference signal resource of the j-th available bandwidth.

In some embodiments, if the UE simultaneously succeeds in the LBT on more than 1 available bandwidths or in the spatial configuration directions of more than 1 reference signal resources, the UE can perform one of the following.

For example, the UE may randomly select a reference signal resource among reference signal resources with a successful LBT operation, and use spatial configuration of the reference signal resource to perform subsequent transmission of information. Alternatively, the UE may determine spatial configuration information used in the subsequent transmission based on other indication information of the base station. The subsequent transmission may include PUCCH transmission, PUSCH transmission or SRS transmission.

For another example, the UE may select a reference signal resource associated with an available bandwidth with a minimum sequence number among reference signal resources with a successful LBT operation, and use spatial configuration of the reference signal resource associated with the available bandwidth to perform the subsequent information transmission. Alternatively, the UE may determine spatial configuration information used in the subsequent transmission based on other indication information of the base station. The subsequent transmission may include PUCCH transmission, PUSCH transmission or SRS transmission.

For another example, the UE may select a reference signal resource associated with an available bandwidth with a maximum sequence number among reference signal resources with a successful LBT operation, and use spatial configuration corresponding to the reference signal resource associated with the available bandwidth to perform the subsequent information transmission. Alternatively, the UE may determine spatial configuration information used in the subsequent transmission based on other indication information of the base station. The subsequent transmission may include PUCCH transmission, PUSCH transmission or SRS transmission.

For another example, the UE may select a reference signal resource corresponding to a minimum value of Ninit among the reference signal resources with a successful LBT operation, and use spatial configuration of the reference signal resource for the subsequent information transmission. Alternatively, the UE may determine spatial configuration information used in the subsequent transmission based on other indication information of the base station. The subsequent transmission may include PUCCH transmission, PUSCH transmission or SRS transmission.

For another example, the UE may select a reference signal resource corresponding to a maximum value of Ninit among the reference signal resources with a successful LBT operation, and use spatial configuration of the reference signal resource for the subsequent information transmission. Alternatively, the UE may determine spatial configuration information used in the subsequent transmission based on other indication information of the base station. The subsequent transmission may include PUCCH transmission, PUSCH transmission or SRS transmission.

In some embodiments, S103 may include: performing uplink data transmission in the listen direction on the available bandwidth in which direction the LBT operation has succeeded, so as to access the channel.

Embodiments of the present disclosure may sufficiently adapt to the concept of partial bandwidth (such as BWP or subband) introduced in the NR system. By providing the channel access method where LBT is achieved based on a portion of bandwidth of a carrier on an unlicensed band, the UE may better meet OCB requirements for transmitted signals on the unlicensed band in the NR system.

Further, the listen direction is determined based on spatial configuration of the reference signal resource configured for the UE. Therefore, after the LBT operation succeeds, the UE may perform uplink transmission based on the spatial configuration of the reference signal resource, so as to access the channel which has been successfully listened to via further interaction with the base station.

Figure 3:
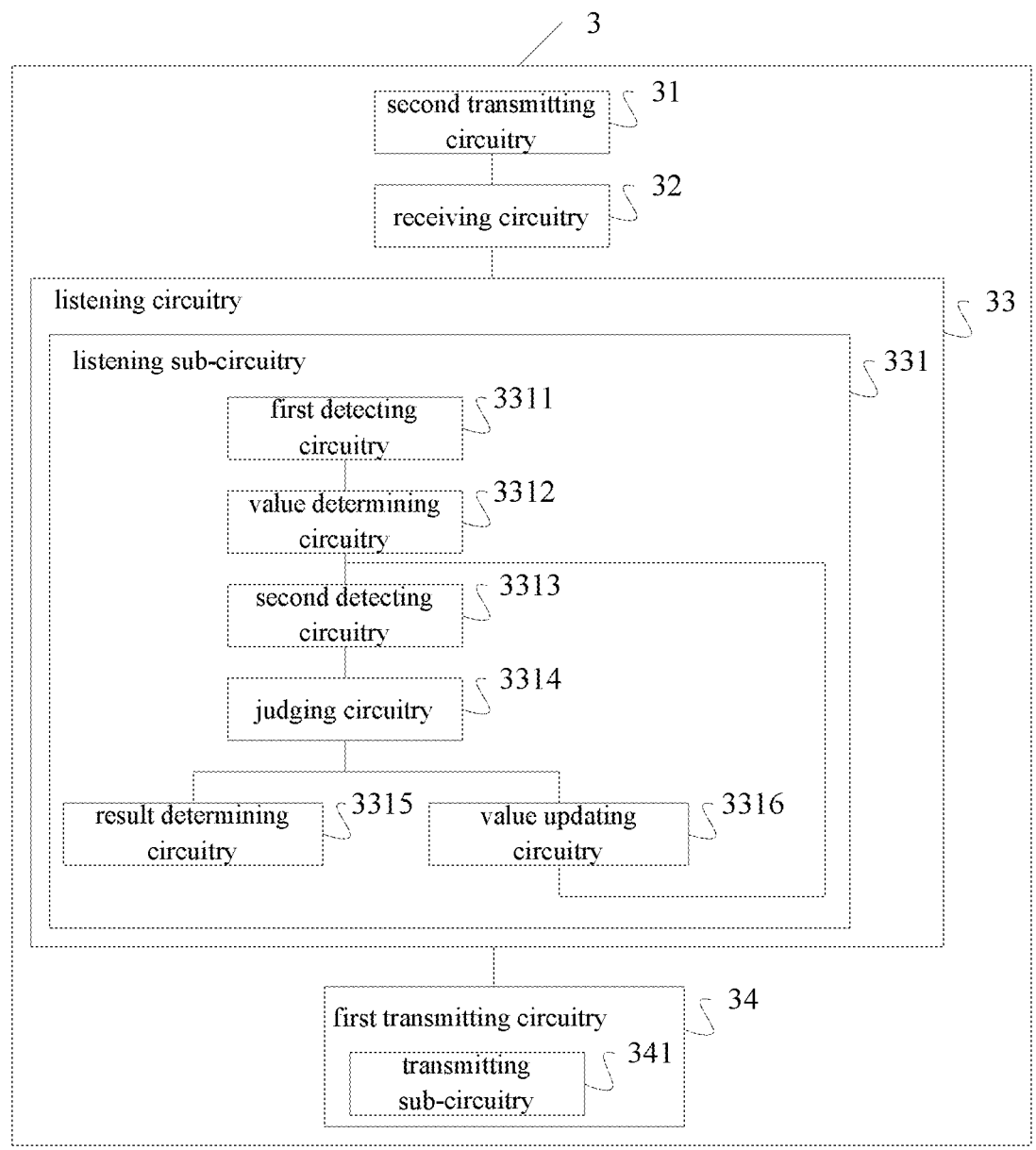
FIG. 3 is a structural diagram of a channel access device according to an embodiment.

FIG. 3 is a structural diagram of a channel access device according to an embodiment. The channel access device 3 is configured to perform the method as shown in FIGS. 1 and 2.

In some embodiments, the channel access device 3 include: a receiving circuitry 32 configured to receive configuration information, wherein the configuration information includes configuration information of at least one available bandwidth that is configured to perform an LBT operation, and the at least one available bandwidth is a portion of bandwidth of a carrier; a listening circuitry 33 configured to perform the LBT operation on the at least one available bandwidth indicated by the configuration information to listen to a channel; and a first transmitting circuitry 34 configured to: when the LBT operation on any one of the at least one available bandwidth succeeds, perform uplink data transmission on the available bandwidth to access the channel.

In some embodiments, the device 3 further includes a second transmitting circuitry 31 configured to: before receiving the configuration information, transmit LBT capability report information, wherein the LBT capability report information indicates the number of the at least one available bandwidth that is configured to perform the LBT operation.

In some embodiments, the LBT capability report information is selected from a group consisting of: the number of one or more available bandwidths for the LBT operation simultaneously performed on one carrier; the number of one or more available bandwidths for the LBT operation simultaneously performed on a plurality of carriers; the number of one or more available bandwidths for the LBT operation performed on one carrier; and the number of one or more available bandwidths for the LBT operation performed on a plurality of carriers.

In some embodiments, each of the at least one available bandwidth is associated with at least one listen direction that is determined based on spatial configuration of a reference signal resource, and the listening circuitry 33 includes a listening sub-circuitry 331 configured to: for each of the at least one available bandwidth, perform the LBT operation in each listen direction associated with the available bandwidth.

In some embodiments, the listening sub-circuitry 331 includes: a first detecting circuitry 3311 configured to detect an idle status of the channel within a first preset duration, wherein the first preset duration is indicated based on the configuration information; a value determining circuitry 3312 configured to: if a detection result within the first preset duration indicates that the channel is in the idle status, for each listen direction associated with the available bandwidth, after the first preset duration expires, determine a count value, wherein the count value indicates whether to listen to the channel in the listen direction associated with the available bandwidth, and is a random number selected from a preset range which is determined based on a preset value and the configuration information; a second detecting circuitry 3313 configured to continue detecting the idle status of the channel within a second preset duration; a judging circuitry 3314 configured to: if a detection result within the second preset duration indicates that the channel is in the idle status, determine whether the count value is zero; and a result determining circuitry 3315 configured to: if the count value is zero, determine that the LBT operation in the listen direction associated with the available bandwidth succeeds.

In some embodiments, the listening sub-circuitry 331 further includes: a value updating circuitry 3316 configured to: when the count value is not zero, decrease the count value by one, and feed back to the second detecting circuitry 3313 to continue detecting the idle status of the channel within the second preset duration until the detection result within the second preset duration indicates that the channel is in the idle status.

In some embodiments, the first transmitting circuitry 34 includes a transmitting sub-circuitry 341 configured to perform uplink data transmission in the listen direction associated with the available bandwidth in which direction the LBT operation succeeds, to access the channel.

In some embodiments, the configuration information is received via a primary cell or a secondary cell.

In some embodiments, the at least one available bandwidth is selected from a group consisting of BWP and subband.

In some embodiments, the configuration information includes position indication information of the at least one available bandwidth.

In some embodiments, the configuration information includes type indication information of LBT.

In some embodiments, the configuration information includes spatial configuration indication information of LBT, used to indicate the listen direction where the LBT operation is performed.

In some embodiments, the configuration information includes indication information of a channel access level.

In some embodiments, the configuration information includes indication information of an LBT timer.

In some embodiments, the configuration information includes activation indication information of LBT.

In some embodiments, the configuration information includes deactivation indication information of LBT.

In some embodiments, the configuration information is carried by any of a high-layer signaling (such as an RRC signaling), a PDCCH, a DCI or a MAC-CE.

More details of working principles and working modes of the device 3 can be found in the above descriptions of FIGS. 1 and 2, and are not described here.

Figure 4:
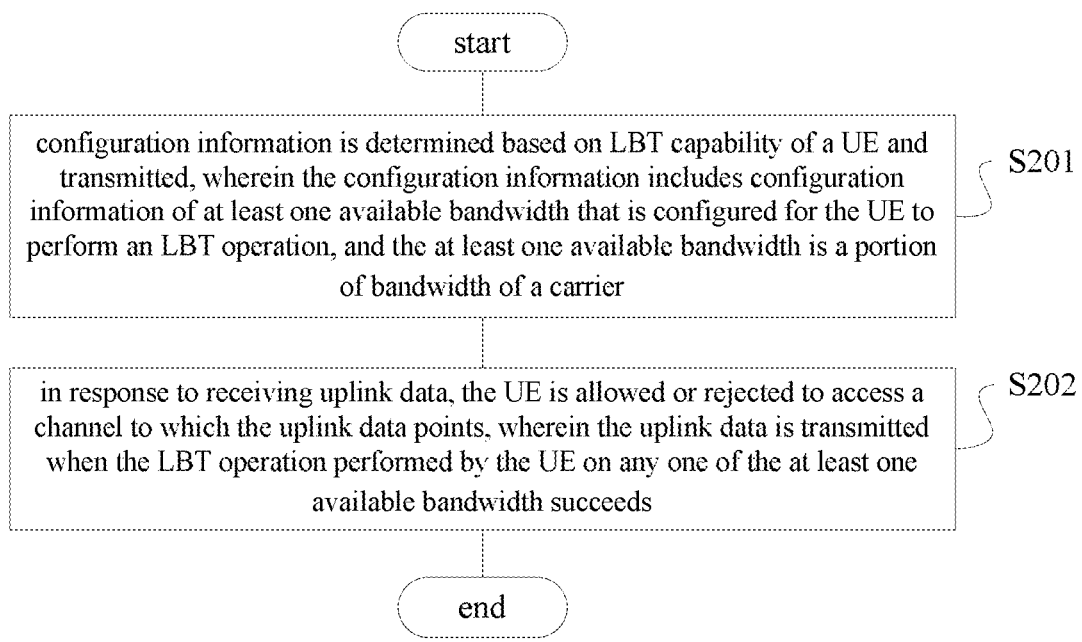
FIG. 4 is a flow chart of a channel access method according to an embodiment.

FIG. 4 is a flow chart of a channel access method according to an embodiment. The method may be applied at a network side, e.g., performed by a base station at the network side. The method may be applied in a channel access scenario where LBT is achieved based on a portion of bandwidth of a carrier on an unlicensed band. Further, with the method, after the LBT succeeds, uplink transmission may be performed based on spatial configuration of a reference signal resource, so as to access a channel which has been successfully listened to.

Referring to FIG. 4, in some embodiments, the method may include S201 and S202.

In S201, configuration information is determined based on LBT capability of a UE and transmitted, wherein the configuration information includes configuration information of at least one available bandwidth that is configured for the UE to perform an LBT operation, and the at least one available bandwidth is a portion of bandwidth of a carrier.

In S202, in response to receiving uplink data, the UE is allowed or rejected to access a channel to which the uplink data points, wherein the uplink data is transmitted when the LBT operation performed by the UE on any one of the at least one available bandwidth succeeds.

Interpretation of terms may be referred to the above descriptions of FIGS. 1 and 2, and is not described in detail here.

In some embodiments, the LBT capability of the UE is determined based on LBT capability report information reported by the UE, so as to know the LBT capability of the UE more accurately and further configure the at least one available bandwidth for the UE more reasonably.

For example, before S201, the method may further include receiving the LBT capability report information reported by the UE, so as to determine the number of the at least one available bandwidth for the UE to perform the LBT operation.

In some embodiments, the LBT capability report information is selected from a group consisting of: the number of one or more available bandwidths for the LBT operation simultaneously performed on one carrier; the number of one or more available bandwidths for the LBT operation simultaneously performed on a plurality of carriers; the number of one or more available bandwidths for the LBT operation performed on one carrier; and the number of one or more available bandwidths for the LBT operation performed on a plurality of carriers.

In some embodiments, the LBT capability of the UE may be a default value predefined by the base station. For example, all the UEs may support performing the LBT operation merely on one available bandwidth.

In some embodiments, the LBT capability of the UE is acquired via pre-interaction with the UE.

For example, when the UE initially accesses a cell of the base station, the base station may interact with the UE to know device capability of the UE, so as to determine the LBT capability of the UE, which enables to determine the number of the at least one available bandwidth supported by the UE.

In some embodiments, the configuration information is transmitted via a primary cell or a secondary cell where the UE is located.

In some embodiments, the at least one available bandwidth is selected from a group consisting of BWP and subband.

In some embodiments, the configuration information includes position indication information of the at least one available bandwidth.

In some embodiments, the configuration information includes type indication information of LBT.

In some embodiments, the configuration information includes spatial configuration indication information of LBT, used to indicate the listen direction where the LBT operation is performed.

In some embodiments, the configuration information includes indication information of a channel access level.

In some embodiments, the configuration information includes indication information of an LBT timer.

In some embodiments, the configuration information includes activation indication information of LBT.

In some embodiments, the configuration information includes deactivation indication information of LBT.

In some embodiments, the configuration information is carried by any of a high-layer signaling (such as an RRC signaling), a PDCCH, a DCI or a MAC-CE.

In some embodiments, in S202, a determination standard for whether to allow the UE to access the channel to which the uplink data points may be determined based on existing protocols.

From above, embodiments of the present disclosure allow the base station to configure for the UE a portion of bandwidth of a carrier as the available bandwidth where the LBT operation is performed by the UE, so as to better adapt to regulations of relevant protocols in the NR system and to cooperate with the UE to achieve channel access with higher efficiency.

Figure 5:
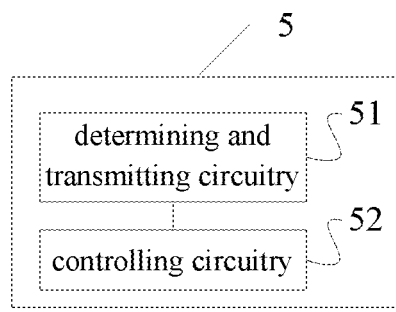
FIG. 5 is a structural diagram of a channel access device according to an embodiment.

FIG. 5 is a structural diagram of a channel access device according to an embodiment. The channel access device 5 is configured to perform the method as shown in FIG. 4.

In some embodiments, the channel access device 5 include: a determining and transmitting circuitry 51 configured to: determine configuration information based on LBT capability of a UE, and transmit the configuration information, wherein the configuration information includes configuration information of at least one available bandwidth that is configured for the UE to perform an LBT operation, and the at least one available bandwidth is a portion of bandwidth of a carrier; and a controlling circuitry 52 configured to: in response to receiving uplink data, allow or reject the UE to access a channel to which the uplink data points, wherein the uplink data is transmitted when the LBT operation performed by the UE on any one of the at least one available bandwidth succeeds.

In some embodiments, the LBT capability of the UE is determined based on LBT capability report information reported by the UE.

In some embodiments, the LBT capability report information is selected from a group consisting of: the number of one or more available bandwidths for the LBT operation simultaneously performed on one carrier; the number of one or more available bandwidths for the LBT operation simultaneously performed on a plurality of carriers; the number of one or more available bandwidths for the LBT operation performed on one carrier; and the number of one or more available bandwidths for the LBT operation performed on a plurality of carriers.

In some embodiments, the LBT capability of the UE is acquired via pre-interaction with the UE.

In some embodiments, the configuration information is received via a primary cell or a secondary cell where the UE is located.

In some embodiments, the at least one available bandwidth is selected from a group consisting of BWP and subband.

In some embodiments, the configuration information includes position indication information of the at least one available bandwidth.

In some embodiments, the configuration information includes type indication information of LBT.

In some embodiments, the configuration information includes spatial configuration indication information of LBT, used to indicate the listen direction where the LBT operation is performed.

In some embodiments, the configuration information includes indication information of a channel access level.

In some embodiments, the configuration information includes indication information of an LBT timer.

In some embodiments, the configuration information includes activation indication information of LBT.

In some embodiments, the configuration information includes deactivation indication information of LBT.

In some embodiments, the configuration information is carried by any of a high-layer signaling (such as an RRC signaling), a PDCCH, a DCI or a MAC-CE.

More details of working principles and working modes of the device 5 can be found in the above descriptions of FIG. 3, and are not described here.

Figure 6:
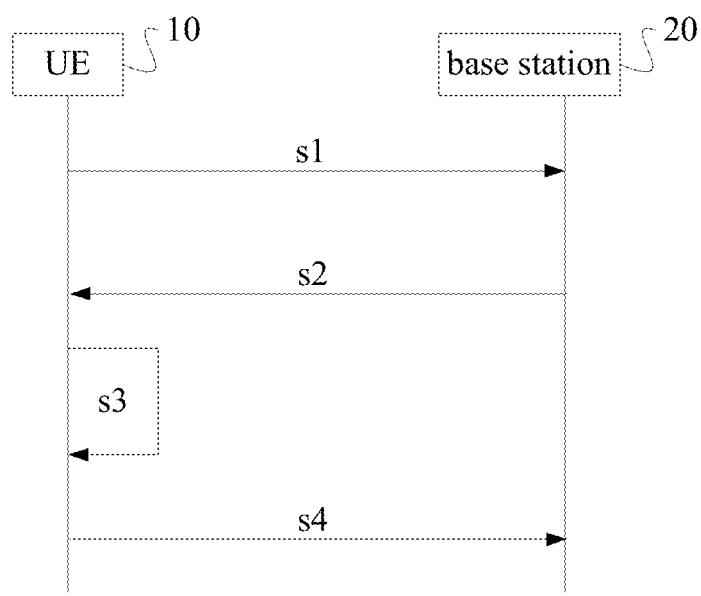
FIG. 6 is a diagram of signaling interaction in a typical application scenario according to an embodiment.

Referring to FIG. 6, in a typical application scenario, signaling interaction between the UE and the base station according to an embodiment is described below.

In the embodiment, a UE 10 performs s1 to transmit the LBT capability report information to a base station (such as gNB) 20 to report to the base station 20 the number of at least one available bandwidth supported for performing the LBT operation.

Further, the base station 20 performs s2 to determine configuration information for the UE 10 based on the received LBT capability report information of the UE 10 and feed it back to the UE 10. The configuration information may be transmitted through an RRC signaling.

Further, in response to receiving the configuration information, the UE 10 performs s3 to activate a LBT function corresponding to an available bandwidth at a time indicated by the configuration information, and the LBT operation may be performed in a spatial configuration direction of at least one reference signal resource of the at least one available bandwidth (one or more available bandwidths).

In some embodiments, the UE 10 may determine respective bandwidths and frequency domain positions of the at least one available bandwidth allocated by the base station 20 to the UE 10 based on the configuration information, i.e., determining link locations that can be used to perform the LBT operation.

In some embodiments, the UE 10 may determine an LBT type in units of available bandwidth, carrier or UE 10 based on the configuration information.

In some embodiments, the UE 10 may determine a channel access level in units of available bandwidth, carrier or UE 10 based on the configuration information.

In some embodiments, the UE 10 may determine an activation time and a function duration of the LBT function in units of available bandwidth, carrier or UE 10 based on the configuration information.

In some embodiments, the UE 10 may determine the listen direction in units of available bandwidth, carrier or UE 10 based on the configuration information.

For example, based on the configuration information, the UE 10 determines that the base station 20 allocates 5 BWPs for it to perform the LBT operation. Three of the 5 BWPs are located on a same carrier (denoted as a carrier 1), the other two are located on two different carriers (denoted as a carrier 2 and a carrier 3), and the carriers 1 to 3 are associated with the UE10.

The configuration information may further include activation indication information of the UE 10, and in response to the activation indication information, the UE 10 simultaneously activates the LBT function on 5 BWPs. The listen directions on each BWP are determined based on spatial configuration indication information included in the configuration information.

The configuration information may further include channel access level indication information of the carrier 1, channel access level indication information of the carrier 2, and channel access level indication information of the carrier 3. In response to the three indication information, the UE 10 may look up a table (such as Table 1) to determine a start time condition (related to a first preset duration) of performing the LBT operation in at least one listen direction of the corresponding BWP, and determine a count value after performing the LBT operation.

When the LBT operation is successful in any listen direction of any BWP, the UE 10 may perform uplink transmission in the listen direction of the BWP, so as to access the channel which has been successfully listened to.

In some embodiments, the configuration information may include timer indication information of each BWP, and timing starts after the LBT function of each BWP is activated. For each BWP, when its activation time reaches a time indicated by its corresponding timer indication information, the LBT function of the BWP is deactivated, and the UE 10 no longer listens on the BWP.

When the LBT operation succeeds in a spatial configuration direction of any reference signal resource in any available bandwidth, the UE 10 may perform s4 to perform uplink transmission in the spatial configuration direction of the reference signal resource of the available bandwidth, to try to access the channel which has been successfully listened to.

More details of working principles and working modes of the UE 10 and the base station 20 can be found in the above descriptions of FIGS. 1 to 5, and are not described here.

In an embodiment of the present disclosure, a storage medium having computer instructions stored therein is provided, wherein when the computer instructions are executed, any one of the above methods as shown in FIG. 1, 2 or 4 is performed. The storage medium may include a non-volatile or non-transitory memory. The storage medium may include a Read Only Memory (ROM), a Random Access Memory (RAM), a magnetic disk or an optical disk.

In an embodiment of the present disclosure, a terminal including a memory and a processor is provided, wherein the memory has computer instructions stored therein, and when the processor executes the computer instructions, the above method as shown in FIGS. 1 and 2 is performed. In some embodiments, the terminal may be a UE.

In an embodiment of the present disclosure, a base station including a memory and a processor is provided, wherein the memory has computer instructions stored therein, and when the processor executes the computer instructions, the above method as shown in FIG. 4 is performed.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A channel access method, comprising:
   receiving configuration information, wherein the configuration information comprises configuration information of at least one available bandwidth that is configured to perform an LBT operation, and the at least one available bandwidth is a portion of bandwidth of a carrier;
   performing the LBT operation on the at least one available bandwidth indicated by the configuration information to listen to a channel; and
   when the LBT operation on any one of the at least one available bandwidth succeeds, performing uplink data transmission on the available bandwidth to access the channel,
   wherein each of the at least one available bandwidth is associated with at least one listen direction that is determined based on spatial configuration of a reference signal resource, and performing the LBT operation on the at least one available bandwidth indicated by the configuration information comprises: for each of the at least one available bandwidth, performing the LBT operation in each listen direction associated with the available bandwidth.

2. The method according to claim 1, further comprising:
   before receiving the configuration information, transmitting LBT capability report information, wherein the LBT capability report information indicates the number of the at least one available bandwidth that is configured to perform the LBT operation.

3. The method according to claim 2, wherein the LBT capability report information is selected from a group consisting of:
   the number of one or more available bandwidths for the LBT operation simultaneously performed on one carrier;
   the number of one or more available bandwidths for the LBT operation simultaneously performed on a plurality of carriers;
   the number of one or more available bandwidths for the LBT operation performed on one carrier; and
   the number of one or more available bandwidths for the LBT operation performed on a plurality of carriers.

4. The method according to claim 1, wherein for each of the at least one available bandwidth, performing the LBT operation in each listen direction associated with the available bandwidth comprises:
   detecting an idle status of the channel within a first preset duration, wherein the first preset duration is indicated based on the configuration information;
   if a detection result within the first preset duration indicates that the channel is in the idle status, for each listen direction associated with the available bandwidth, after the first preset duration expires, determining a count value, wherein the count value indicates whether to listen to the channel in the listen direction associated with the available bandwidth, and is a random number selected from a preset range which is determined based on a preset value and the configuration information;
   continuing detecting the idle status of the channel within a second preset duration;
   if a detection result within the second preset duration indicates that the channel is in the idle status, determining whether the count value is zero; and
   if the count value is zero, determining that the LBT operation in the listen direction associated with the available bandwidth succeeds.

5. The method according to claim 4, wherein for each of the at least one available bandwidth, performing the LBT operation in each listen direction associated with the available bandwidth further comprises:
   when the count value is not zero, decreasing the count value by one, and continuing detecting the idle status of the channel within the second preset duration until the detection result within the second preset duration indicates that the channel is in the idle status.

6. The method according to claim 4, wherein performing uplink data transmission on the available bandwidth to access the channel comprises:
performing uplink data transmission in the listen direction associated with the available bandwidth in which direction the LBT operation succeeds, to access the channel.

7. The method according to claim 1, wherein the at least one available bandwidth is selected from a group consisting of BWP and subband.

8. The method according to claim 1, wherein the configuration information is selected from a group consisting of:
position indication information of the at least one available bandwidth;
type indication information of LBT;
spatial configuration indication information of LBT, used to indicate the listen direction where the LBT operation is performed;
indication information of a channel access level; and
activation indication information of LBT and timer indication information.

9. The method according to claim 1, wherein the configuration information is carried by any of a high-layer signaling, a PDCCH, or a MAC-CE.

10. A storage medium having computer instructions stored therein, wherein when the computer instructions are executed, the method according to claim 1 is performed.

11. A terminal comprising a memory and a processor, wherein the memory has computer instructions stored therein, and when the processor executes the computer instructions, the method according to claim 1 is performed.

12. A channel access method, comprising:
determining configuration information based on LBT capability of a UE, and transmitting the configuration information, wherein the configuration information comprises configuration information of at least one available bandwidth that is configured for the UE to perform an LBT operation, and the at least one available bandwidth is a portion of bandwidth of a carrier; and
in response to receiving uplink data, allowing or rejecting the UE to access a channel to which the uplink data points, wherein the uplink data is transmitted when the LBT operation performed by the UE on any one of the at least one available bandwidth succeeds,
wherein each of the at least one available bandwidth is associated with at least one listen direction that is determined based on spatial configuration of a reference signal resource, and for each of the at least one available bandwidth, the UE performs the LBT operation in each listen direction associated with the available bandwidth.

13. The method according to claim 12, wherein the LBT capability of the UE is determined based on LBT capability report information reported by the UE.

14. The method according to claim 13, wherein the LBT capability report information is selected from a group consisting of:
the number of one or more available bandwidths for the LBT operation simultaneously performed on one carrier;
the number of one or more available bandwidths for the LBT operation simultaneously performed on a plurality of carriers;
the number of one or more available bandwidths for the LBT operation performed on one carrier; and
the number of one or more available bandwidths for the LBT operation performed on a plurality of carriers.

15. The method according to claim 12, wherein the LBT capability of the UE is acquired via pre-interaction with the UE.

16. The method according to claim 12, wherein the at least one available bandwidth is selected from a group consisting of BWP and subband.

17. The method according to claim 12, wherein the configuration information is selected from a group consisting of:
position indication information of the at least one available bandwidth;
type indication information of LBT;
spatial configuration indication information of LBT, used to indicate the listen direction where the LBT operation is performed;
indication information of a channel access level; and
activation indication information of LBT and timer indication information.

18. The method according to claim 12, wherein the configuration information is carried by any of a high-layer signaling, a PDCCH, or a MAC-CE.

19. A base station comprising a memory and a processor, wherein the memory has computer instructions stored therein, and when the processor executes the computer instructions, the method according to claim 12 is performed.

* * * * *